(12) United States Patent
Caretti et al.

(10) Patent No.: US 8,254,947 B2
(45) Date of Patent: Aug. 28, 2012

(54) METHOD OF DIMENSIONING RADIO ACCESS NETWORKS, CORRESPONDING SYSTEM AND COMPUTER PROGRAM PRODUCT

(75) Inventors: Marco Caretti, Turin (IT); Ivano Salvatore Collotta, Turin (IT); Roberto Lanzo, Turin (IT); Dario Sabella, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 13/141,953

(22) PCT Filed: Dec. 23, 2008

(86) PCT No.: PCT/IT2008/000786
§ 371 (c)(1),
(2), (4) Date: Jun. 23, 2011

(87) PCT Pub. No.: WO2010/073271
PCT Pub. Date: Jul. 1, 2010

(65) Prior Publication Data
US 2011/0263265 A1 Oct. 27, 2011

(51) Int. Cl.
*H04W 72/00* (2009.01)
(52) U.S. Cl. ............... 455/450; 455/446; 455/452.1; 455/453; 370/280; 370/329
(58) Field of Classification Search .......... 455/446, 455/450, 452.1, 453; 370/280, 329
See application file for complete search history.

(56) References Cited

U.S. PATENT DOCUMENTS

| | | | |
|---|---|---|---|
| 6,173,186 B1 * | 1/2001 | Dalley | 455/446 |
| 6,631,266 B1 * | 10/2003 | Lee et al. | 455/446 |
| 6,865,169 B1 * | 3/2005 | Quayle et al. | 370/335 |
| 7,395,058 B1 * | 7/2008 | Kalofonos et al. | 455/423 |
| 7,580,387 B2 * | 8/2009 | Kayama et al. | 370/329 |
| 7,586,893 B2 * | 9/2009 | Takano | 370/348 |

(Continued)

FOREIGN PATENT DOCUMENTS
WO 02/35872 A1 5/2002
(Continued)

OTHER PUBLICATIONS

Written Opinion and International Search Report mailed Oct. 5, 2009, PCT/IT2008/000786.

(Continued)

*Primary Examiner* — Jinsong Hu
*Assistant Examiner* — Qun Shen
(74) *Attorney, Agent, or Firm* — Banner & Witcoff, Ltd.

(57) ABSTRACT

Downlink and uplink communication resources to ensure network coverage and satisfy assigned traffic requirements in a communication network are allocated by setting a given balance of downlink and uplink communication resources while leaving a part of downlink and uplink communication resources remaining to be allocated. Downlink cell radius and uplink cell radius values are then determined which ensure network coverage with the resources as previously allocated. An effective cell radius is then selected as the smaller of the downlink and uplink cell radius and then a first check is made as to whether the effective cell radius selected satisfies the assigned traffic requirements. If not, the effective cell radius is updated. If so, a further check may be made as whether the resources remaining to be allocated for downlink and uplink have a difference in excess of a given amount. If yes, the procedure is repeated by setting an updated balance of downlink and uplink communication resources reducing that difference. If not, the communication resources are allocated on the basis of the current balance.

18 Claims, 6 Drawing Sheets

U.S. PATENT DOCUMENTS

| | | | |
|---|---|---|---|
| 7,593,420 B2* | 9/2009 | Park et al. | 370/436 |
| 7,853,260 B2* | 12/2010 | Holma et al. | 455/443 |
| 7,894,324 B2* | 2/2011 | Laroia et al. | 370/203 |
| 7,944,879 B2* | 5/2011 | Choi et al. | 370/329 |
| 2002/0102984 A1* | 8/2002 | Furuskar et al. | 455/452 |
| 2003/0095572 A1* | 5/2003 | Efthymiou | 370/468 |
| 2005/0130662 A1* | 6/2005 | Murai | 455/444 |
| 2005/0174954 A1* | 8/2005 | Yun et al. | 370/310 |
| 2005/0265299 A1 | 12/2005 | Franceschini et al. | |
| 2006/0056365 A1* | 3/2006 | Das et al. | 370/338 |
| 2007/0280098 A1* | 12/2007 | Bhatt et al. | 370/208 |
| 2008/0123569 A1* | 5/2008 | Doss et al. | 370/280 |
| 2008/0188231 A1* | 8/2008 | Zhu et al. | 455/450 |
| 2008/0232278 A1* | 9/2008 | Brunel et al. | 370/275 |
| 2008/0285513 A1* | 11/2008 | Jung et al. | 370/329 |
| 2008/0310362 A1* | 12/2008 | McBeath et al. | 370/330 |
| 2009/0305709 A1* | 12/2009 | Panico et al. | 455/446 |
| 2009/0319236 A1* | 12/2009 | Blaunshtein et al. | 703/1 |
| 2010/0278034 A9* | 11/2010 | Laroia et al. | 370/209 |

FOREIGN PATENT DOCUMENTS

WO    2006/033603 A1    3/2006

OTHER PUBLICATIONS

Dimensioning cellular multihop WiMAX networks by Hoymann, C.; Dittrich, M.; Goebbels, S., Mobile WiMAX Symposium, 2007. IEEE, Volume , Issue , Mar. 25-29, 2007 Page(s):150-157.

"Radio Network Dimensioning and Planning for WiMAX Networks", Bharathi Upase, Mythri Hunukumbure, Sunil Vadgama, Fujitsu Sci. Tech. J., 43,4, p. 435-450 (Oct. 2007).

WiMAX System Evaluation Methodology, Version 1.7, Sep. 2007.

"Dimensioning Cellular WiMAX Part I: Singlehop Networks" by Hoymann, Christian and Göbbels, Stephan, European Wireless 2007, In Proceedings of European Wireless 2007, Apr. 2007, 7 pages.

* cited by examiner

US 8,254,947 B2

METHOD OF DIMENSIONING RADIO ACCESS NETWORKS, CORRESPONDING SYSTEM AND COMPUTER PROGRAM PRODUCT

CROSS REFERENCE TO RELATED APPLICATIONS

This is a U.S. National Phase Application under 35 U.S.C. §371 of International Application No. PCT/IT2008/000786, filed Dec. 23, 2008, which was published Under PCT Article 21(2), the entire contents of which are incorporated herein by reference.

FIELD OF THE INVENTION

This disclosure relates to techniques for dimensioning communications networks.

This disclosure was devised with specific attention paid to its possible use in dimensioning radio access networks in cellular networks. WiMAX, LTE or, more generally, OFDMA (Orthogonal Frequency-Division Multiple Access) networks are exemplary of such cellular communication networks.

DESCRIPTION OF THE RELATED ART

A main purpose pursued in dimensioning a communication network is to evaluate costs and benefits associated with the technology used. Usually, such a preliminary evaluation does not involve a detailed network project, but rather focuses on the calculation of the number of sites (that contribute to the costs) and performance in terms of capacity (that is the main benefit to be evaluated).

Several methods have been proposed in the literature to estimate the cell radius in cellular communications. Some of these methods consider just coverage constraints and some others take into account also traffic requirements.

Document US2005/0265299 A1 describes a method for dimensioning a network based on code division multiple access techniques (CDMA) for input parameters representing coverage requirements and/or capacity requirements and/or quality requirements.

As regards OFDMA systems, various articles address the issue of evaluating the effective capacity of the radio access network.

For instance, the article "Dimensioning cellular multihop WiMAX networks" by Hoymann, C.; Dittrich, M.; Goebbels, S., Mobile WiMAX Symposium, 2007. IEEE, Volume, Issue, 25-29 Mar. 2007 Page(s):150-157 considers a multihop WiMAX system.

Other documents such as the article "Radio Network Dimensioning and Planning for WiMAX Networks", Bharathi Upase, Mythri Hunukumbure, Sunil Vadgama, FUJITSU Sci. Tech. J., 43, 4, p. 435-450 (October 2007) describe possible system dimensioning in a fairly organic and complete way.

FIGS. 1 and 2 are examples of TDD and FDD radio frames in certain OFDMA systems such as WiMAX where radio resources dedicated to signaling (for DL and UL) and data transmission are shared in that both in TDD (Time Division Duplexing—FIG. 1) and FDD (Frequency Division Duplexing—FIG. 2) the DL subframe contains, in addition to DL data transmission, signaling relative to both DL and UL.

OBJECT AND SUMMARY OF THE INVENTION

The inventors have observed that the techniques discussed in the foregoing exhibit a number of drawbacks in that, i.e.

they consider DownLink (DL) and Uplink (UL) transmission in separate phases, they do not analyze the relationship between downlink and uplink capacity;

they do not account for the effect of overhead on the capacity of both links (and on their relationship);

while aiming at calculating system capacity (for the radio access part) in order to estimate a possible number of base stations needed to serve the traffic demand (taking into account coverage and capacity requirements) they do not address specific features of an OFDMA system.

Additionally, the inventors have noted that, in connection with TDD and FDD arrangements where the DL subframe contains signaling to both DL and UL (see FIGS. 1 and 2) DL capacity depends on UL capacity. Also, in certain traffic patterns based on bidirectional connections (e.g. VoIP, Videocall, . . . ), UL capacity depends on DL capacity, so that DL and UL are strictly linked. The need is therefore felt for techniques enabling joint UL/DL dimensioning.

An object of the invention is to overcome these drawbacks and provide a response to existing needs.

According to the present invention, such an object is achieved by means of a method having the features set forth in the claims that follow.

The invention also relates to a corresponding system (e.g. a computerized workstation programmed for implementing the method of the invention), as well as a corresponding computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is intended to highlight the possibility for the present invention to be implemented in a distributed/modular fashion.

An embodiment of the arrangement described herein satisfies the needs of a telecommunication operator, with emphasis placed on the radio access, by providing directions for estimating the number of sites in the first phase of evaluation of a technology as well as an estimate of cell performance, in terms of average throughput and/or number of available voice/data connections in the cell.

An embodiment of the arrangement described herein provides an accurate dimensioning, in conjunction with an easy usage pattern associated with an iterative procedure.

In an embodiment, a dimensioning procedure based on iterative setting of traffic requirements and consequent calculation of radio resources occupation, leads (by successive approximations) to a correct value for a WiMAX cell radius, under given propagation and traffic conditions. The cell radius value thus obtained can be maximized by means of at least one further iteration where the balance of resources assigned to DL and UL sub-frames (usually designated the DL/UL switching point) is changed and at the same time is optimized.

In an embodiment, an iterative method to perform dimensioning of a wireless access network for an OFDMA system (like WiMAX or LTE) is provided.

An embodiment of the arrangement described herein makes it possible to determine the cell radius as a function of:

radio parameters of the BS (Base Station)

radio parameters of the Mobile Stations associated to the BS the typology of scenario considered traffic models amount of traffic offered to the cell.

Embodiments of the arrangement described herein can apply to WiMAX systems, as well as to any OFDMA systems, such as LTE. Consequently, reference herein to e.g. a WiMAX system is purely by way of exemplary description of an embodiment is not to be construed in a limiting sense.

In an embodiment, by considering the WiMAX and in particular the TDD profile, the operator is enabled to configure the DL/UL switching point.

In an embodiment, while also calculating in an alternative way the cell radius, the DL/UL switching point is optimized as a function of traffic requirements considered.

In an embodiment, a dimensioning method for OFDMA systems, like WiMAX or LTE, solves the problem related to dimensioning of the radio access part; this can be considered as a pre-planning phase, where a telecommunication operator wishes to assess in advance what the wireless access performance of a certain technology, while understanding the potential of that technology.

In an embodiment, evaluating a radio technology is made possible by also enabling an optimal parameterization of the system.

In an embodiment, by defining an optimized cell radius the number of base stations (BSs) to cover a certain area can be assessed: in fact, calculating the cell radius (and then the cell area) makes it possible to identify a suitable number of BSs to serve a certain traffic demand in a specific environment.

In an embodiment, average cell capacity can be evaluated, which may be useful to compare a given technology against other technologies.

While certain embodiments apply to WiMAX systems, the arrangement described herein is applicable to various OFDMA technologies and does not depend on the specific OFDMA technology involved.

The arrangement described herein lends itself both to TDD and FDD frame configurations (for WiMAX or LTE or other OFDMA technologies) e.g. in embodiments where DL and UL resources are allocated following the indications contained in a control channel transmitted by the BS (then in the DL subframe), so that DL capacity is affected by the overhead due to the UL part. In the case of a TDD radio frame, a degree of freedom may result from the possibility of balancing the DL subframe and the UL subframe by selecting the time duration of each part, while the frame duration is considered constant. In the case of a FDD radio frame, a similar degree of freedom may result from the possibility of balancing the DL subframe and the UL subframe by selecting the bandwidth allotted to each part, while the total bandwidth used is considered constant. In both instances use of the overall resources can be optimized, via the choice of an optimal DL/UL ratio. Since LTE can be configured with both FDD and TDD duplexing profiles, embodiments of the arrangement described herein can be applied without loss of generality to WiMAX and LTE systems.

In an embodiment, the arrangement described herein can be incorporated as a module in a more complex tool for dimensioning communication networks; such a tool can thus provide strategic analysis in the pre-planning phase, e.g. in dimensioning WiMAX or LTE radio access.

BRIEF DESCRIPTION OF THE ANNEXED VIEWS

The invention will now be described, by way of example only, with reference to the enclosed views, wherein.

DETAILED DESCRIPTION OF EMBODIMENTS

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the embodiments.

While an exemplary embodiment will be described with reference to a Mobile WiMAX system, this disclosure applies also to other systems, such as any OFDMA systems, e.g. 3GPP LTE.

By way of introduction, the exemplary scenario considered will be described, followed by a list of the main definitions contained in the description.

Figure 1:
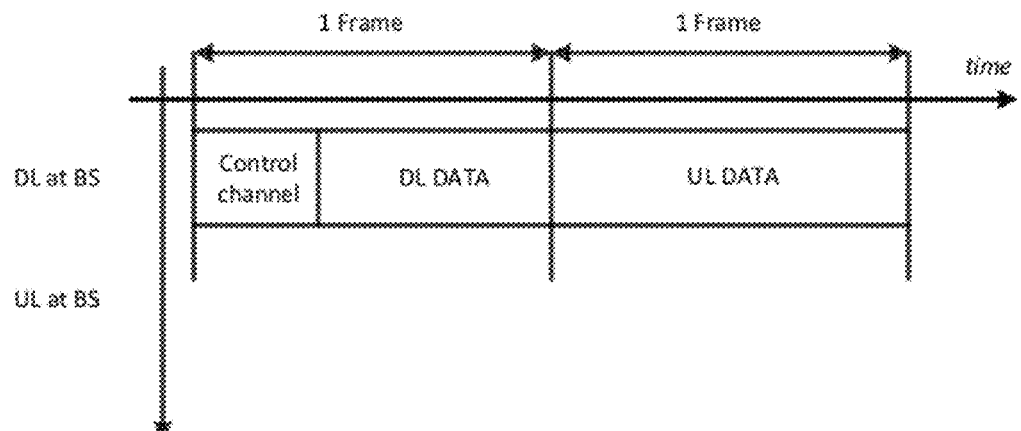
FIGS. 1 and 2 are examples of TDD and FDD radio frames, as discussed in the foregoing.
Figure 2:
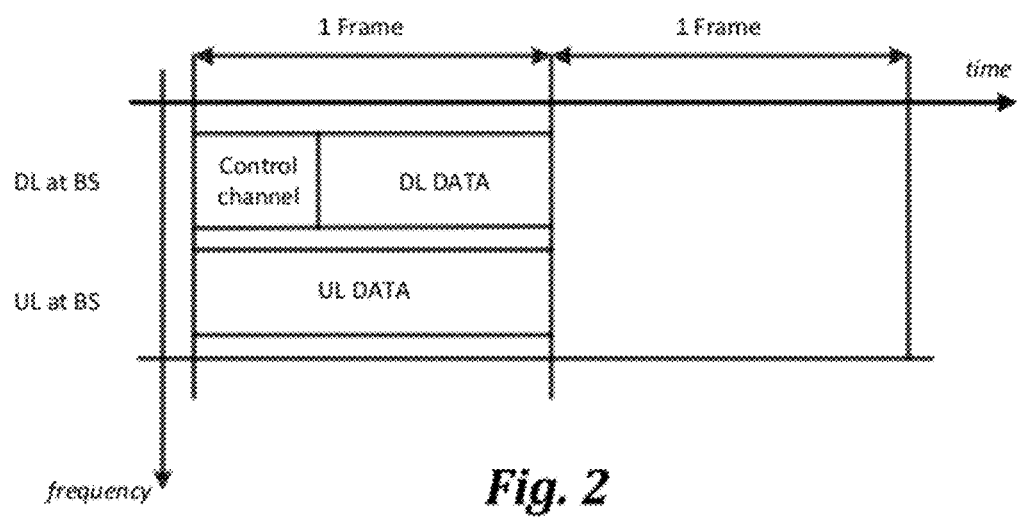
Figure 3:
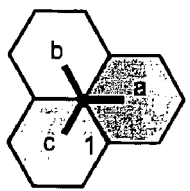
FIG. 3 is representative of a central site in a cellular communication network.
Figure 4:
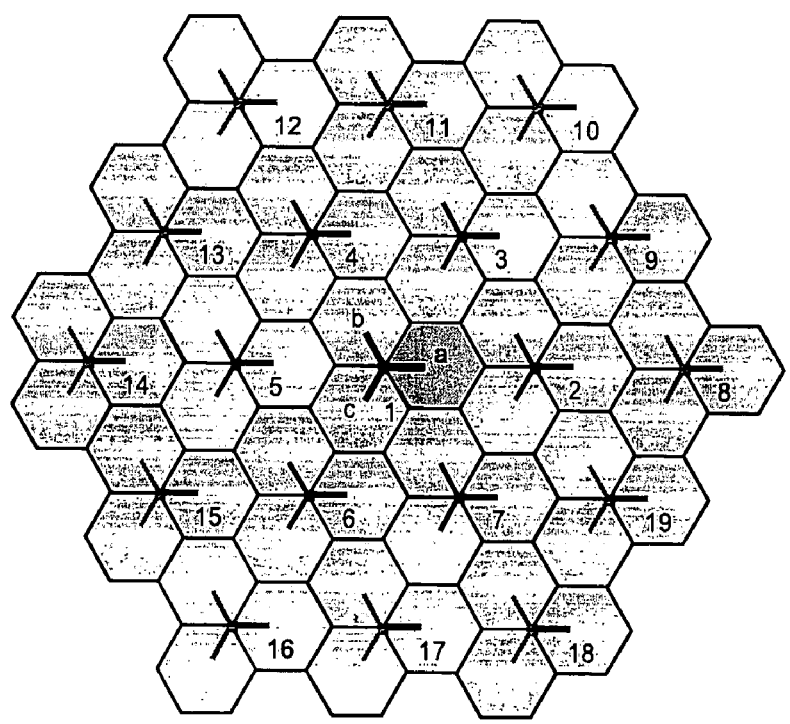
FIG. 4 is representative of a scenario with a central site and two tiers of interferer sites in a cellular communication network

In this description, an exemplary multi-cell scenario is considered, that is a configuration in which there is a useful cell and a number of interferer cells. In the embodiment illustrated tri-sectorial sites, including three sectors a, b, and c (see FIG. 3) and a 2-tier scenario (see FIG. 4) will be considered, but the disclosure applies to other types of scenarios (like a different number of cells per site, or a different number of interferer sites).

Similarly, the position of the interferer sites considered in this example and also the shape of each cell is regular, but the disclosure applies to different positions of the sites and other cell shapes.

For the sake of simplicity, all the calculations detailed in the following will be assumed to be performed in the central cell (1A) that is considered to be the "useful" cell, while all the other cells will be considered as interferers.

The following table lists a number of definitions used throughout this description.

TABLE 1

Definitions

| Parameter | Description | Comments |
|---|---|---|
| $x_i$ | Amount of DL resources in the radio frame used at the i-th iteration | Resources can be defined in terms of slots available, or OFDMA symbols available, or other types of elementary units. |
| $y_i$ | Amount of UL resources in the radio frame used at the i-th iteration | Resources can be defined in terms of slots available, or OFDMA symbols available, or other types of elementary units. |
| X | Total amount of DL resources in the radio frame | Resources can be defined in terms of slots available, or OFDMA symbols available, or other types of elementary units. |
| Y | Total amount of UL resources in the radio frame | Resources can be defined in terms of slots available, or OFDMA symbols available, or other types of elementary units. |
| $r_0$ | DL/UL ratio chosen as initial condition | This ratio can be chosen near to 1 for considering balanced services (similar DL and UL occupations) |
| $r_i$ | DL/UL ratio at the i-th iteration | At the last iteration, this value is the final DL/UL ratio produced by the method. |
| $R_{DL}$ | Suggested DL cell radius | |
| $R_{UL}$ | Suggested UL cell radius | |
| $R_0$ | Cell radius chosen as initial condition | |
| $R_i$ | Cell radius at the i-th iteration | At the last iteration, this value is the final cell radius produced by the method. |
| $t_i$ | Amount of traffic at the i-th iteration | Expressed with the same unit of the DL and UL resources. |
| $m_{DL}$ | Amount of DL capacity considered as margin in the invention | Expressed with the same unit of the DL and UL resources. |
| $m_{UL}$ | Amount of UL capacity considered as margin in the invention | Expressed with the same unit of the DL and UL resources. |

Figure 5:
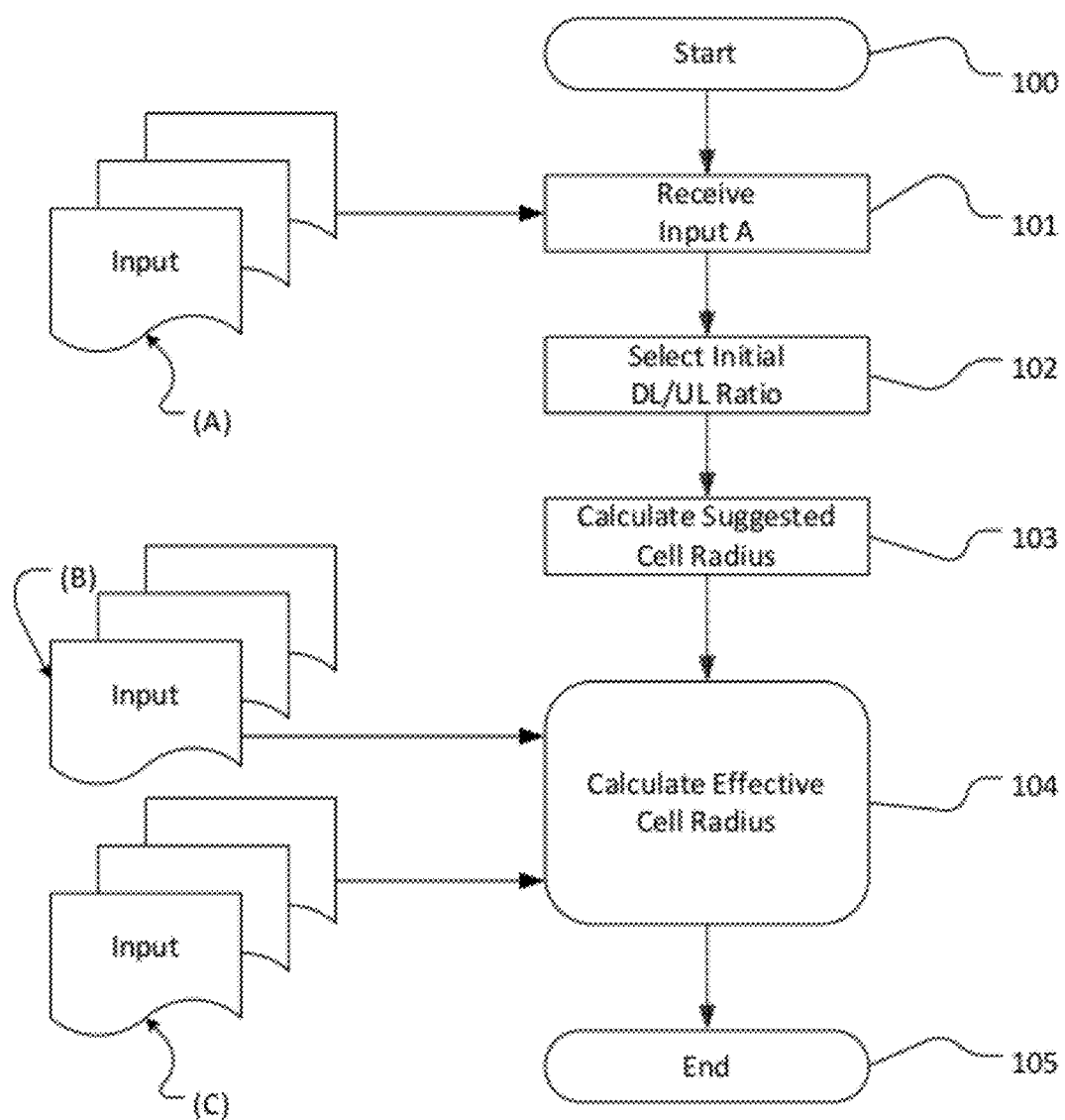
FIG. 5 is a functional flow chart showing macro steps in a dimensioning procedure as described herein.

As shown in FIG. 5, an embodiment of the procedure described herein involves, after a start step 100, the choice of an input set of data A, including e.g.:

- system input parameters (e.g. bandwidth (5, 10 MHz, . . . )),
- antenna parameters,
- type of scenario (rural, urban, . . . ),
- characteristics of the Base Station and of the subscriber stations (SS) (or mobile stations, MS).

For instance a frequency of 3.5 GHz, a bandwidth of 10 MHz, a sub-urban scenario can be considered.

Table 2 below reproduces an exemplary full list of input parameters.

TABLE 2 input parameters

| Parameter | Description | Comments |
|---|---|---|
| Frequency [MHz] | Carrier frequency | Used for propagation channel parameters calculation |
| Bandwidth [MHz] | Channel bandwidth of the OFDM signal | Used together with the FFT size to compute the noise bandwidth |
| DL OFDMA Symbols | Number of OFDM symbols used in the DL subframe | These parameters are used to compute the DL/UL ratio |
| UL OFDMA Symbols | Number of OFDM symbols used in the UL subframe | |
| N_FFT | FFT size | Used to properly divide the total transmitted power to each subcarrier |
| Base Station MAX TX Power [dBm] | Maximum base station transmitted power in a single channel bandwidth | Parameter used in the downlink link budget |
| Base Station Antenna Gain [dBi] | Maximum antenna gain of the base station | Parameter used in the downlink and uplink link budget |
| Base Station Feeder Loss [dB] | Losses due to the cables, connectors, etc. between the antenna connector and base station transceiver | Parameter used in the downlink and uplink link budget |
| Base Station Sensitivity [dBm] | Minimum received power at the base station in uplink, used to compute the maximum cell range | Parameter used in the uplink link budget |
| Mobile Station TX Power [dBm] | Maximum mobile station transmitted power in a single channel bandwidth | Parameter used in the uplink link budget |
| Mobile Station Antenna Gain [dBi] | Maximum antenna gain of the mobile station | Parameter used in the downlink and uplink link budget |
| Mobile Station Feeder Loss [dB] | Losses due to the cables, connectors, etc. between the antenna connector and mobile station transceiver | Parameter used in the downlink and uplink link budget |
| Mobile Station Sensitivity [dBm] | Minimum received power at the mobile station in downlink, used to compute the maximum cell range | Parameter used in the downlink link budget, usually this value depends on the minimum throughput to be delivered to the mobile station |
| Indoor Loss [dB] | Loss due to the building penetration | These margins are used in the link budget to compute the maximum cell range in uplink and downlink |
| Body Loss [dB] | Loss due to the interaction of the transmitted signal with the human body | |
| Interference Margin [dB] | Margin used in the link budget to take into account the interference coming from the other cells | |
| Shadowing Margin [dB] | This margin takes into account the variability of the signal due to the slow fluctuations and corresponds a margin necessary to guarantee the service in a given percentage of area (e.g. 90%). | |
| Frequency reuse factor | This factor takes into account how the available frequency channels are distributed among the cells in the scenario | The modification of the channel used by each cell in the scenario impacts the CINR (carrier to interference plus noise ratio) distribution |

TABLE 2-continued input parameters

| Parameter | Description | Comments |
|---|---|---|
| Propagation environment | Propagation environment considered in the dimensioning. Typical environment are Dense Urban, Urban, SubUrban and Rural | The choice of the propagation environment influences the model used to compute the attenuation that |

In a step designated 101, the set of parameters A is input to a processing system. This can be any computer currently used for network design purposes (e.g., a personal computer).

In a step 102, a choice is the made of the initial DL/UL balancing (e.g. DL/UL ratio equal to 1:1, 1.5:1, 2:1 . . . ).

As indicated, resources can be defined e.g. in terms of slots available, or OFDMA symbols available, or other types of elementary units.

By way of explanation, a DL/UL ratio equal to 2:1 means that DL resources are double respect to UL resources). A DL/UL ratio equal to 27/20 is assumed here by way of example.

As regards the WiMAX system, a set of DL/UL ratios may be compliant with the system profiles (described by the WiMAX Forum for the certification of the devices): as an example, for those devices working with a bandwidth of 10 MHz, possible DL/UL ratios belong to the following set {(35,12), (34,13}, (33,14), (32,15), . . . , (27,20), (26,21)}. The first number in each pair is the number of OFDMA symbols in DL, while the second number is the amount of UL symbols (being the total of symbols equal to 47).

In the case of e.g. an FDD system which does not permit to modify the balancing between DL and UL bands, the step 102 directed at optimizing the switching point can be skipped.

Irrespective of whether the step 102 is performed or not, the procedure then evolves towards the calculation of a suggested $R_{DL}$ cell radius for DL and a suggested cell radius $R_{UL}$ for UL (step 103).

These suggested radiuses are the radius values for the cell (in DL and UL transmission, respectively) adapted to ensure coverage of the territory served by the network (both for DL and for UL).

A preliminary part of step 103 takes care calculating coverage constraints e.g. in the form of DL and UL link budget calculations. This may be any known type of link budget calculations using as an input a set of parameters describing the characteristics and performance of transmitting Tx and receiving Rx equipment, and providing as an output the Maximum Allowable Path Loss (MAPL), i.e. the maximum value of path loss between receiver and transmitter in order to guarantee the performance in input.

A further part of step 103 is the calculation of the distance between Tx and Rx (cell radius) related to the aforementioned value of MAPL. This step can be performed by any reliable propagation model, validated e.g. by means of extensive measurement campaigns.

As an example, the well-known Hata model can be used for this purpose. Two link budget calculations (for UL and DL, respectively) are performed to calculate the MAPL.

The following tables provide two examples of UL and DL link budget data which allow to calculate the $MAPL_{UL}$ and $MAPL_{DL}$.

TABLE 3

DL link budget example

| Item | Value | Input Number |
|---|---|---|
| Mobile Station | | |
| Rx Sensitivity [dBm] | −90 | Input #1 |
| Margins and MS Gain/Loss | | |
| Rx Antenna Gain [dBi] | 6 | Input #2 |
| Rx Feeder loss [dB] | 0 | Input #3 |
| Interference Margin [dB] | 3 | Input #4 |
| Body Loss [dB] | 0 | Input #5 |
| Indoor Loss [dB] | 15 | Input #6 |
| Shadowing Margin [dB] | 7 | Input #7 |
| Sensitivity including margins [dBm] | −71 | =(1) − (2) + (3) + (4) + (5) + (6) + (7) |
| Base Station | | |
| Tx Power [dBm] | 30 | Input #8 |
| Tx Antenna Gain [dBi] | 16 | Input #9 |
| Tx Feeder loss [dB] | 3 | Input #10 |
| EIRP [dBm] | 43 | =(8) + (9) − (10) |
| Output | | |
| Propagation Loss DL [dB] | 114 | EIRP- Sensitivity including margins |

TABLE 4

UL link budget example

| Item | Value | Input Number |
|---|---|---|
| Base Station | | |
| Rx Sensitivity [dBm] | −100 | Input #1 |
| Margins and BS Gain/Loss | | |
| Rx Antenna Gain [dBi] | 16 | Input #2 |
| Rx Feeder loss [dB] | 3 | Input #3 |
| Interference Margin [dB] | 3 | Input #4 |
| Body Loss [dB] | 0 | Input #5 |
| Indoor Loss [dB] | 15 | Input #6 |
| Shadowing Margin [dB] | 7 | Input #7 |
| Sensitivity including margins [dBm] | −88 | =(1) − (2) + (3) + (4) + (5) + (6) + (7) |
| Mobile Station | | |
| Tx Power [dBm] | 25 | Input #8 |
| Tx Antenna Gain [dBi] | 6 | Input #9 |
| Tx Feeder loss [dB] | 0 | Input #10 |
| EIRP [dBm] | 31 | =(8) + (9) − (10) |
| Output | | |
| Propagation Loss UL [dB] | 119 | EIRP- Sensitivity including margins |

The Hata formula is as follows:

$$PropLoss = 69.55 + 26.16 \cdot \log_{10} f - 13.82 \cdot \log_{10} h_f - a(h_m) + (44.9 - 6.55 \cdot \log_{10} h_f) \cdot \log_{10} d$$

where:
PropLoss=the Propagation Loss [dB]
f=Frequency [MHz] (e.g. 2000 MHz)
$h_f$=Base Station height a.g.l. [m] (e.g. 30 m)
d=distance [km]
and $$a(h_m) = (1.1 \cdot \log_{10} f - 0.7) \cdot h_m - (1.56 \log_{10} f - 0.8)$$

Where
$h_m$=mobile height a.g.l. [m]
if $h_m$=1.5 m and f=2000 MHz, $a(h_m)$ is about 0 dB From the Hata formula it is possible to calculate d as follows $$d=10^{\wedge}((\text{PropLoss}-(69.55+26.16.1\cdot\log_{10}f-13.82\cdot\log_{10}h_f-a(h_m)))/(44.9-6.55\cdot\log_{10}h_f))$$

when PropLoss=MAPL, d=R. Using the values calculated in the tables before we obtain:

$$\text{MAPL}_{DL}=114\text{ dB}\rightarrow R_{DL}=245\text{ m}$$

$$\text{MAPL}_{UL}=119\text{ dB}\rightarrow R_{UL}=340\text{ m}$$

Calculation of the effective cell radius R (also by optimizing DL and UL resources usage) takes the place in a (macro) step 104, while step 105 marks the end of the dimensioning process.

It will be appreciated that the values for $R_{DL}$ and $R_{UL}$ will generally differ. In the exemplary case made here, $R_{DL}/R_{UL}<1$ even if the DL/UL resource rate is 27/20 i.e. >1.

The step 104 uses further input sets B and C including:
the distribution of traffic demand, and the mix of services considered in the scenario (set B); and
the corresponding traffic models (set C).

To sum up, the main input "blocks" considered to implement the procedure as described herein include:
system parameters: bandwidth, antenna parameters, type of scenario considered, environment (dense urban, urban, sub-urban and rural)—i.e. input set A;
the distribution of traffic demand and the mix of services— i.e. the input set B.

For example, the traffic demand can include different types of services (like VoIP, or data services).

As regards the distribution of traffic demand in the cell (generally traffic demand will not be uniform over space) a map of user distribution over the territory or space can be considered, while an example of traffic mix can be found in the following table:

TABLE 5

Example of a mix of services

| Service | Percentage of usage |
|---|---|
| VoIP | 40% |
| Videocall | 5% |
| FTP | 10% |
| HTTP | 40% |
| Video Streaming | 5% |

As regards traffic models (set C) the calculation of the occupation of radio resources takes into account also the traffic models considered.

For example, the WiMAX Forum has developed Traffic Models (see e.g. WiMAX Forum, AATG group: "WiMAX System Evaluation Methodology", Version 1.7, September 2007) that describe resource usage at IP layer for typical traffic profiles and services (FTP, TCP/IP connections, E-Mail, Gaming, Web Browsing . . . ).

The radio resource occupation can be calculated in terms of average slots used in DL and in UL for each connection by using these statistical models.

By way of example, if $x_{i,MCS_{DL}}^{(s)}$ denotes the DL occupation of the single connection relative to the service s, a value will exist for each Modulation and Coding Scheme (MCS) considered, e.g.:

| DL MCS | $X_{i,MCS_{DL}}^{(s)}$ [slots] |
|---|---|
| QPSK ½ rep 6 | 22 |
| QPSK ½ rep 4 | 17 |
| QPSK ½ rep 2 | 13 |
| QPSK ½ | 11 |
| QPSK ¾ | 10 |
| 16 QAM ½ | 9 |
| 16 QAM ¾ | 7 |
| 64 QAM ½ | 6 |
| 64 QAM ⅔ | 4 |
| 64 QAM ¾ | 2 |
| 64 QAM ⅚ | 1 |

Figure 6:
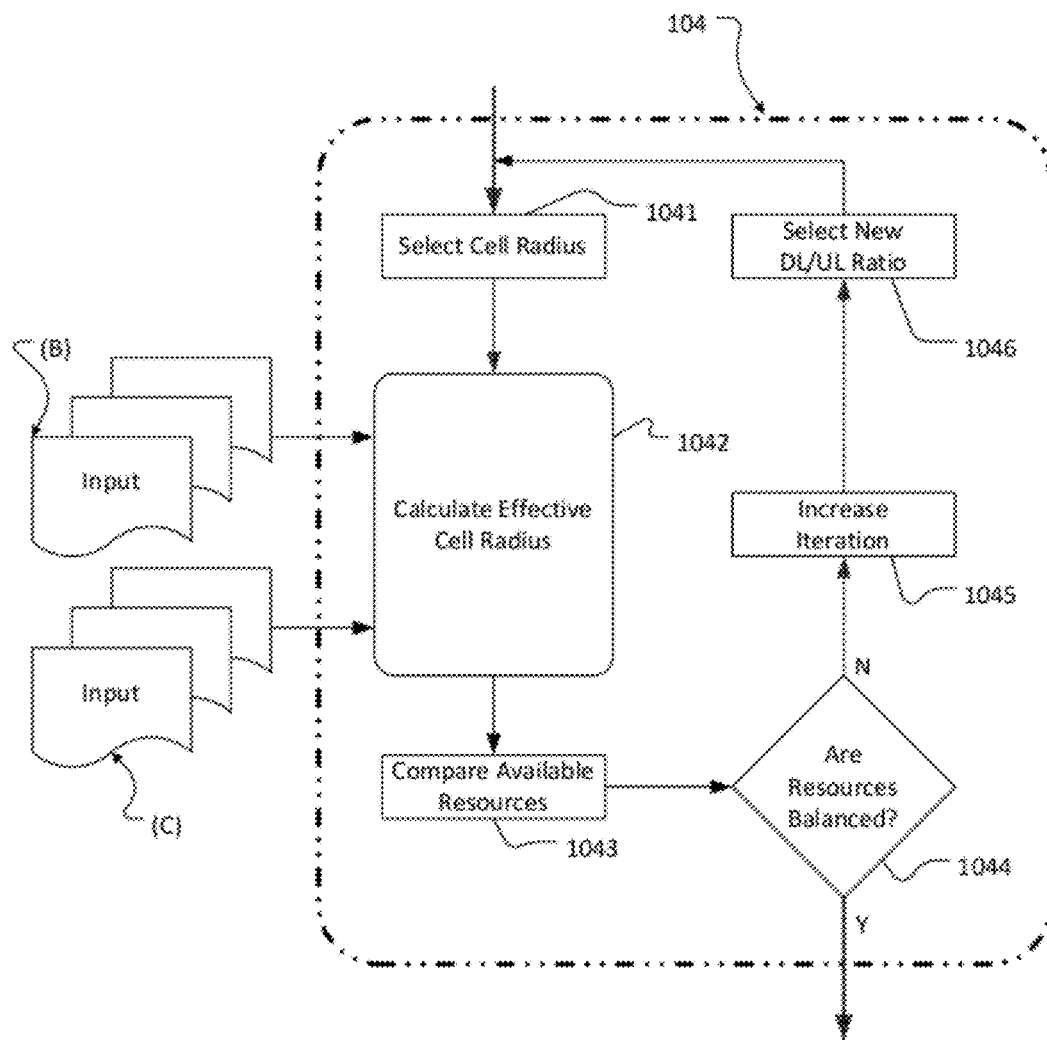
FIG. 6 is a functional flow chart exemplary of calculation of effective cell radius and DL/UL optimization as described herein.

The flow chart of FIG. 6 further details the step 104. This can be considered as a macro step implemented by means of an iterative procedure. In fact the optimization of the cell radius as exemplified herein involves an iteration that considers the correct balancing between DL and UL resources usage.

As detailed in FIG. 6, the step 104 includes various sub-steps 1041 to 1046.

In 1041 a first choice is made of the initial cell radius $R_i=R_0$, that is the maximum possible radius considering just coverage constraints.

It will otherwise be appreciated that this "maximum" radius is in fact selected as the smaller of $R_{DL}$ and $R_{DL}$ since coverage being ensured for the smaller of the two (irrespective of whether for DL or UL) will automatically guarantee that coverage is ensured also for the larger.

In 1042 (further detailed in FIG. 7) the effective cell radius R is calculated. This calculation can be implemented iteratively (then at each internal step $R_i$ is updated) and takes into account the capacity constraints B and C (the distribution of traffic demand, the mix of services considered in the scenario and the corresponding traffic models); as a result a cell radius $R_i$ is determined as the radius that permits to have absence of losses in terms of capacity, whereby there is a certain amount of resources that are still free in the radio frame.

In 1043 a comparison between the remaining resources available in DL and in UL is performed: the values of $(X-x_i)$ and $(Y-y_i)$ are calculated. If the difference between these two values is greater than a threshold, the frame at this iteration is considered unbalanced (between DL and UL).

In 1044 a check is made as to whether the remaining resources available in DL and in UL are balanced. In the affirmative, i.e. if the resources are balanced, the iteration ends (i.e. the step 104 is exited). In the negative, the number of the current iteration is increased in 1045.

In 1046 a new DL/UL ratio is chosen and the sub-steps 1041, 1042, 1043, and 1044 are repeated (always starting with the radius $R_0$) in order to optimize resource usage.

Figure 7:
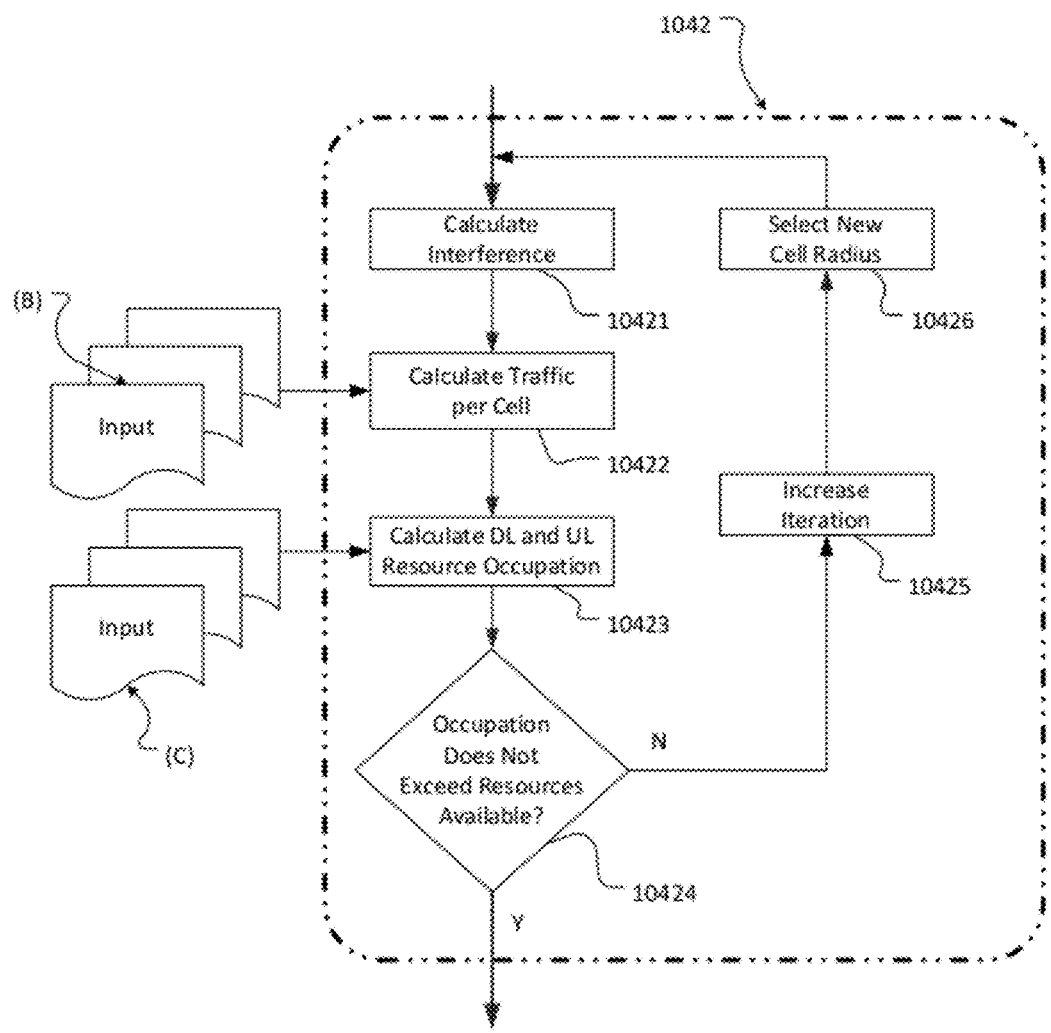
FIG. 7 is a functional flow chart further detailing calculation of effective cell radius and DL/UL optimization as described herein.

The sub-step 1042 of calculating the effective cell radius R is further detailed in FIG. 7 and includes, at 10421, the calculation of interference.

The area (hexagon, here) corresponding to the Cell 1A (see FIGS. 3 and 4) is divided into N elementary area elements, called "pixels". For each pixel n the received power due to each cell i (i=1a, . . . , 19c) is calculated by means of the following formula:

$$Pn(i)=EIRP(i)-\text{PropLoss}(i)\text{ [dBm]}$$

$$P'n(i)=10^{\wedge}(Pn(i)/10)\text{ [mW]}$$

where EIRP is calculated as in the link budget table and PropLoss is calculated by means of the Hata model.

Then the CINR (Carrier over Interference plus Noise Ratio) in each pixel of the cell 1A hexagon can be computed as follows:

$$CINRn = Pn(1A) - 10\log\left(\sum_{i}^{19C, i \neq 1A} P'n(i) + P'\text{noise}\right)$$

where Pnoise [mW] is the thermal noise power (e.g. from measurements)

The above equation is correct in case of reuse 1 (i.e. individual reuse). In case of reuse 3 (i.e. reuse over base three) the sum has to be calculated using the a-cells contributions only (i=2a, 3a, 4a, ..., 19a).

Since the value of CINR is known in each pixel of the 1a cell, it is possible to calculate the Probability Density Function (PDF) of CINR for the cell 1a. This function can be considered as representative of the typical cell of the considered environment.

Figure 8:
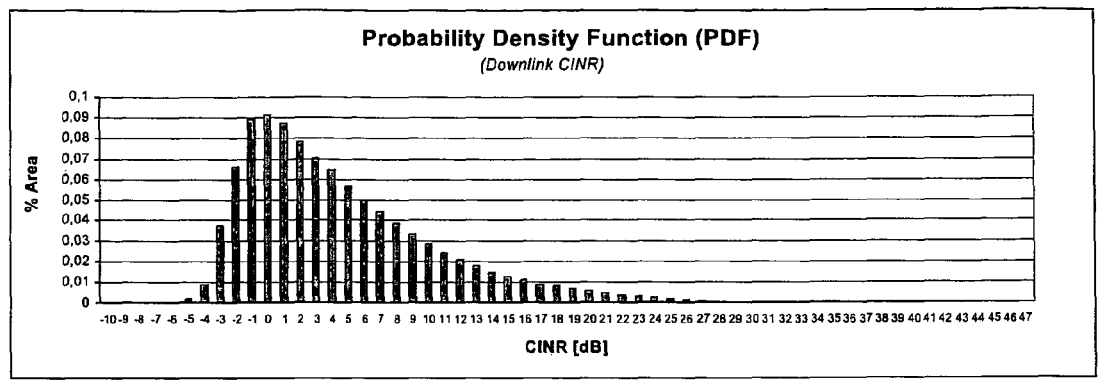
FIG. 8 shows an exemplary PDF function of Channel-to-Interference-plus-Noise Ratio (CINR) in a cell.

FIG. 8 is an example of such a PDF function. There, the γ-axis shows the $P(CINR_{dB})$, i.e. the probability to have a certain value of CINR in dB. In this step, the probability of usage of each MCS (Modulation and Coding Scheme) is also calculated as resulting from the combination of the CINR PDF function and the usage intervals of the MCS, as follows:

$$P_{MCS} = \sum_{CINR_{db} \in I_{MCS}} P(CINR_{db})$$

where $I_{MCS}$ is the usage interval for the MCS (set of values of CINR expressed in dB).

Figure 9:
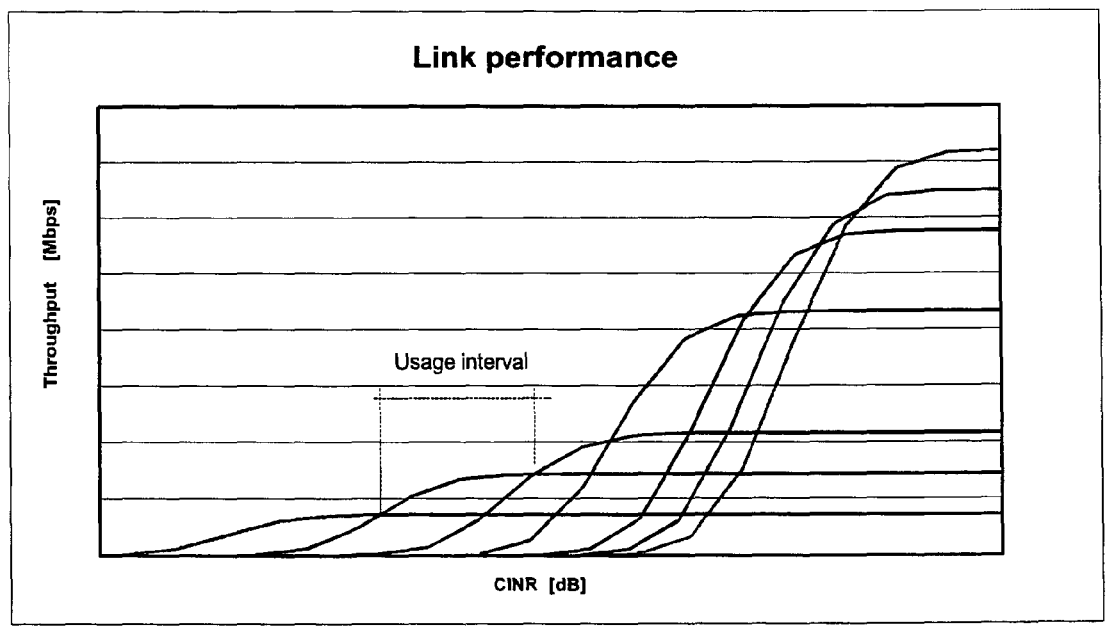
FIG. 9 is an exemplary diagram usage interval for a certain Modulation and Coding Scheme (MCS).

For example, these usage intervals can be calculated as the CINR intervals in which a MCS has the best link performances in terms of throughput. FIG. 9 is an example of usage interval for a certain MCS.

An example of DL MCS distribution is reported in the following table, where each value in the right-hand column is corresponds to the $P_{MCS}$ calculated in the above equation.

TABLE 6

Probability of usage of an MCS

| DL MCS | $P_{MCS_{DL}}$ (Probability of usage of a certain DL MCS) |
|---|---|
| QPSK ½ rep 6 | 1% |
| QPSK ½ rep 4 | 4% |
| QPSK ½ rep 2 | 14% |
| QPSK ½ | 20% |
| QPSK ¾ | 21% |
| 16 QAM ½ | 17% |
| 16 QAM ¾ | 10% |
| 64 QAM ½ | 5% |
| 64 QAM ⅔ | 5% |
| 64 QAM ¾ | 2% |
| 64 QAM ⅚ | 1% |

As a consequence, in 10421 the MCS distribution is calculated by exploiting the knowledge of the CINR distribution.

In 10422 a first calculation is performed of the initial traffic per cell (this depends on the traffic distribution, the amount of traffic offered to the cell and the cell radius); as an example, if a certain service is considered, the traffic demand per cell can be calculated as follows:

$$t_i^{(s)} = T^{(s)}/N_i$$

where i=current step of the iteration s=service considered $T^{(s)}$=the total traffic demand in the scenario (expressed in terms of number of connections requested in the radio frame by the service s)

$N_i$=the number of cells of the scenario (that can be easily given by the ratio between the area of the scenario and the area of the cell)

The value for $t_i^{(s)}$ calculated from $T^{(s)}$, which depends on the user density in the area and on the distribution of traffic demand (input block B). An example of $T^{(s)}$ can be seen in the following table:

TABLE 7

Example of traffic demand in the scenario onsidered

| Service s | $T^{(s)}$ [connections] |
|---|---|
| VoIP | 1200 |
| Videocall | 150 |
| FTP | 300 |
| HTTP | 1200 |
| Video Streaming | 150 | where $T^{(s)}$ (in the case of uniform users distribution) is calculated for each service as the total number of users present in the scenario weighted by the percentage of service considered for that mix of services.

On the other side $N_i$ depends on the cell radius. For example, if the scenario area is 300 km² and the cell radius corresponds to a cell area of 10 km², $N_i$, can be calculated as 300/10=30. If the cell area is smaller (e.g. 5 km²), the same scenario contains a higher number of cells (300/5=60). The following table shows an example referring in which $N_i$=30.

TABLE 8

Example of traffic per cell

| Service s | $t_i^{(s)}$ [connections] |
|---|---|
| VoIP | 40 |
| Videocall | 5 |
| FTP | 10 |
| HTTP | 40 |
| Video Streaming | 5 |

In 10423 a calculation is performed of the DL and UL subframe average occupation (in terms of radio resources needed); this operation takes as input the traffic models C considered for the procedure (then the occupation of each single service in the radio frame.

The resource occupation $x_{i,MCS_{DL}}^{(s)}$ of a single connection (in DL and in UL) is first used: this value depends on the modulation used and can be retrieved from statistical consideration regarding the traffic model used (e.g. WiMAX Forum traffic models).

TABLE 9

Example of DL occupation of a connection for a service s

| DL MCS | $X_{i,MCS_{DL}}^{(s)}$ [slots] |
|---|---|
| QPSK ½ rep 6 | 20 |
| QPSK ½ rep 4 | 18 |
| QPSK ½ rep 2 | 16 |
| QPSK ½ | 14 |
| QPSK ¾ | 12 |
| 16 QAM ½ | 10 |
| 16 QAM ¾ | 8 |
| 64 QAM ½ | 6 |
| 64 QAM ⅔ | 4 |
| 64 QAM ¾ | 2 |
| 64 QAM ⅚ | 1 |

The average occupation of a connection depends on the particular MCS used, and the average occupation is given by weighing the occupations for the respective probability of occurrence $P_{MCS_{DL}}$ of the MCS in the DL subframe.

The following equation is exemplary of calculating the average occupation of a VoIP connection $x_i^{(VoIP)}$ in the DL subframe:

$$x_i^{(VoIP)} = \sum_{MCS_{DL} \in I_{MCS,DL}} x_{i,MCS_{DL}}^{(VoIP)} \cdot P_{MCS_{DL}}$$

where
i=current step of the iteration
$MCS_{DL}$=MCS considered in DL
$I_{MCS,DL}$=set of DL MCS considered
$x_{MCS_{DL}}^{(VoIP)}$=DL occupation of a VoIP connection with the modulation $m_{DL}$ (in a similar way one can define $y_{i,MCS_{DL}}^{(VoIP)}$ as the average occupation of a VoIP connection in the UL subframe)

Using the exemplary values contained in Tables 6 and 9 yields $x_{i,MCS_{DL}}^{(VoIP)}$=11,53 slots.

In general, for a generic service s belonging to the set of services considered (s ∈ $I_{services}$), the following applies (for the DL and UL subframe, respectively):

$$x_i^{(s)} = \sum_{MCS_{DL} \in I_{MCS,DL}} x_{i,MCS_{DL}}^{(s)} \cdot P_{MCS_{DL}}$$

$$y_i^{(s)} = \sum_{MCS_{UL} \in I_{MCS,UL}} y_{i,MCS_{UL}}^{(s)} \cdot P_{MCS_{UL}}$$

The total average occupation of all services considered is then given by summing all the contributions (all the connections of all the services):

$$x_i = \sum_{s \in I_{services}} t_i^{(s)} x_i^{(s)}$$

$$y_i = \sum_{s \in I_{services}} t_i^{(s)} y_i^{(s)}$$

A resource margin is defined for both DL and UL subframes (respectively $m_{DL}$ and $m_{UL}$).

A check is the made at 10424 as to whether for each subframe the needed occupations $x_i$ and $y_i$ (plus a certain possible margin, $m_{DL}$ and $m_{UL}$) do not exceed the amount of resources available—defined respectively as X and Y.

Stated otherwise, at 10424 a check is made as to whether the current value of the effective radius satisfies the traffic requirements for the cell.

If that is the case, then the iteration ends (by exiting step 10424).

Alternatively, the number of the current iteration is increased at 10425 and a smaller cell radius is chosen at 10426 to return to 10421.

The radius at a given iteration can be computed as a given percentage of the radius at the previous iteration (e.g. 90%). A more accurate value is a compromise between convergence speed of the procedure and its accuracy.

Without prejudice to the underlying principles of the invention, the details and the embodiments may vary, even appreciably, with respect to what has been described by way of example only, without departing from the scope of the invention as defined by the annexed claims.

The invention claimed is:

1. In a cellular communication network including a computing device having a processor and memory, a method comprising:
   a) allocating, by the computing device, downlink and uplink communication resources by setting a given balance of downlink and uplink communication resources while leaving a part of said downlink and uplink communication resources remaining to be allocated;
   b) determining, by the computing device, a downlink cell radius and an uplink cell radius that ensure network coverage with said resources as allocated in step a);
   c) selecting, by the computing device, an effective cell radius as the smaller of said downlink cell radius and said uplink cell radius;
   d) checking, by the computing device, whether said selected effective cell radius satisfies assigned cell traffic requirements;
   e) if said selected effective cell radius does not satisfy assigned cell traffic requirements as checked in step d), reducing, by the computing device, said effective cell radius and repeating step d) by using said reduced effective cell radius; and
   f) if said selected effective cell radius satisfies assigned cell traffic requirements as checked in step d), checking, by the computing device, whether said resources remaining to be allocated for downlink differ from said resources remaining to be allocated for uplink in excess of a given amount.

2. The method of claim 1, further comprising:
   g) if said resources remaining to be allocated for downlink and uplink have a difference in excess of a given amount as checked in step f), repeating steps a) to e) by setting an updated balance of downlink and uplink communication resources reducing said difference; and
   h) if said resources remaining to be allocated for downlink and uplink do not have a difference in excess of a given amount as checked in step f), allocating said communication resources as currently allocated.

3. The method of claim 1, wherein said determining downlink and uplink cell radius that ensure network coverage with said resources as allocated involves determining said downlink cell radius and said uplink cell radius at the maximum values ensuring network coverage in downlink and uplink, respectively.

4. The method of claim 1, wherein said determining downlink and uplink cell radius that ensure network coverage with said resources as allocated involves downlink and uplink link budget calculations.

5. The method of claim 4, wherein said downlink and uplink budget calculations involve determining the Maximum Allowable Path Loss to guarantee downlink and uplink performance.

6. The method of claim 5, wherein said downlink and uplink budget calculations involve using the Hata model.

7. The method of claim 1, wherein said checking whether said selected effective cell radius satisfies said assigned cell traffic requirements involves checking whether said selected effective cell radius permits absence of transmission losses, whereby resources remain to be allocated for downlink and uplink.

8. The method of claim 1, wherein said checking whether said selected effective cell radius satisfies said assigned cell traffic requirements involves:
determining an initial cell traffic; and
determining downlink and uplink subframe average occupation in terms of said resources as allocated.

9. The method of claim 8, wherein said determining downlink and uplink subframe average occupation involves:
determining resource occupation values for single cell connections as a function of Modulation and Coding Schemes (MCSs) associated therewith;
determining corresponding average occupation values by weighing said occupation values with the probabilities of occurrence of said MCSs associated therewith; and
determining a total average occupation by summing the average occupation values for all the cell connections.

10. The method of claim 1, wherein said reducing said effective cell radius involves reducing said effective cell radius to a given percentage.

11. The method of claim 1, wherein said setting a given or updated balance of downlink and uplink communication resources includes selecting a ratio of downlink/uplink resources out of a set of downlink/uplink resource ratios compliant with a system profile.

12. The method of claim 1, wherein said cellular communication network is an OFDMA communication network, and wherein said setting a given or updated balance of downlink and uplink communication resources includes selecting a first number of OFDMA symbols for downlink transmission and a second number of OFDMA symbols for uplink transmission.

13. A system for a cellular communication network, the system comprising:
a processor; and
memory storing computer-readable instructions that, when executed by the processor, cause the processor to:
allocate downlink and uplink communication resources by setting a given balance of downlink and uplink communication resources while leaving a part of said downlink and uplink communication resources remaining to be allocated;
determine a downlink cell radius and an uplink cell radius that ensure network coverage with said allocated resources;
select an effective cell radius as the smaller of said downlink cell radius and said uplink cell radius;
check whether said selected effective cell radius satisfies assigned cell traffic requirements; and
if said selected effective cell radius does not satisfy assigned cell traffic requirements, reduce said effective cell radius and repeat checking whether said selected effective cell radius satisfies assigned cell traffic requirements using said reduced effective cell radius; and
if said selected effective cell radius satisfies assigned cell traffic requirements, check whether said resources remaining to be allocated for downlink differ from said resources remaining to be allocated for uplink in excess of a given amount.

14. A non-transitory computer readable medium including software code portions stored thereon that, when executed by a computer, cause the computer to:
allocate downlink and uplink communication resources by setting a given balance of downlink and uplink communication resources while leaving a part of said downlink and uplink communication resources remaining to be allocated;
determine a downlink cell radius and an uplink cell radius that ensure network coverage with said allocated resources;
select an effective cell radius as the smaller of said downlink cell radius and said uplink cell radius;
check whether said selected effective cell radius satisfies assigned cell traffic requirements;
if said selected effective cell radius does not satisfy assigned cell traffic requirements, reduce said effective cell radius and repeat checking whether said selected effective cell radius satisfies assigned cell traffic requirements using said reduced effective cell radius; and
if said selected effective cell radius satisfies assigned cell traffic requirements, check whether said resources remaining to be allocated for downlink differ from said resources remaining to be allocated for uplink in excess of a given amount.

15. The system of claim 13, wherein checking whether said selected effective cell radius satisfies said assigned cell traffic requirements involves:
determining an initial cell traffic; and
determining downlink and uplink subframe average occupation in terms of said resources as allocated.

16. The system of claim 13, wherein setting a given or updated balance of downlink and uplink communication resources includes selecting a ratio of downlink/uplink resources out of a set of downlink/uplink resource ratios compliant with a system profile.

17. The non-transitory computer readable medium of claim 14, wherein checking whether said selected effective cell radius satisfies said assigned cell traffic requirements involves:
determining an initial cell traffic; and
determining downlink and uplink subframe average occupation in terms of said resources as allocated.

18. The non-transitory computer readable medium of claim 14, wherein setting a given or updated balance of downlink and uplink communication resources includes selecting a ratio of downlink/uplink resources out of a set of downlink/uplink resource ratios compliant with a system profile.

* * * * *